United States Patent
Weber et al.

(10) Patent No.: US 6,654,677 B2
(45) Date of Patent: Nov. 25, 2003

(54) METHOD AND SYSTEM FOR PROVIDING VEHICLE CONTROL TO A DRIVER

(75) Inventors: Charles Francis Weber, South Lyon, MI (US); Ross Dykstra Pursifull, Dearborn, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 19 days.

(21) Appl. No.: 09/954,800

(22) Filed: Sep. 18, 2001

(65) Prior Publication Data

US 2003/0055551 A1 Mar. 20, 2003

(51) Int. Cl.[7] .......................... G05G 1/14; F16H 59/70; F02D 11/10
(52) U.S. Cl. ...................... 701/93; 701/54; 477/62
(58) Field of Search .............................. 701/51, 54, 86, 701/93; 477/62, 108, 107, 174, 92, 110; 74/513, 514, 560, 512; 123/399, 396, 479, 400, 361; 180/197

(56) References Cited

U.S. PATENT DOCUMENTS 6,078,860 A    6/2000  Kerns ........................ 701/93

6,332,450 B1   12/2001 Muto et al. ................. 123/352

FOREIGN PATENT DOCUMENTS

| EP | 0728921 A2 | 8/1996 |
|----|-----------|--------|
| GB | 2319635 A | 5/1998 |

*Primary Examiner*—Tan Q. Nguyen
*Assistant Examiner*—Dalena Tran
(74) *Attorney, Agent, or Firm*—John Kajander

(57) ABSTRACT

A method and system for providing vehicle control to a driver utilizes an accelerator pedal position and other various inputs. A powertrain control module uses the accelerator pedal position and the other various inputs to give the driver a combination of speed and torque control. In operating a vehicle at speeds ranging from zero to forty-five miles per hour, the powertrain controller provides the driver with torque control by mapping pedal position to electronic throttle angle according to a plurality of predetermined acceleration functions. In operating the vehicle at speeds greater than forty-five miles per hour, the powertrain controller provides the driver with speed control by mapping the electronic throttle angle according to a plurality of predetermined speed functions. Upon receiving other various inputs, the powertrain controller switches control from one form to the other.

21 Claims, 4 Drawing Sheets

METHOD AND SYSTEM FOR PROVIDING VEHICLE CONTROL TO A DRIVER

TECHNICAL FIELD

The present invention relates generally to controlling the speed of an automobile, and more particularly to the use of a plurality of inputs in order to map an accelerator pedal position to an electronically controlled throttle angle so as to provide a driver with direct control over vehicle output.

BACKGROUND OF THE INVENTION

Developing a vehicle that accurately responds to the commands of a driver is a central goal of today's automotive industry. Specifically, the automotive industry relies on the use of a pedal position to determine the commands of a driver. Until recently, vehicles have been produced that have systems, which map a one-to-one relationship between vehicle pedal position and a throttle angle. Under this system, the driver can directly control the throttle angle and subsequently the amount of fuel and air that enter the engine. While the amount of fuel and air entering the engine indirectly determines the vehicle speed and the torque output, this system, however, does not directly map the pedal position to these two forms of vehicle output. Therefore, with this prior system, the driver does not have direct control over the vehicle speed or the torque output.

With the development of an electronic throttle, it has become possible to change the relationship between the pedal position and the vehicle output. Specifically, the vehicle output can include the vehicle speed and the torque output. Instead of mapping a pedal position to a specific throttle angle, the electronic throttle permits the pedal position to be directly mapped to a vehicle output, which is desired by the driver. This is accomplished by providing a powertrain controller that uses various inputs to determine the commands of the driver. These inputs typically include pedal position and vehicle speed, among other inputs.

One known prior art system for controlling the speed of a vehicle based on sensing a position of an accelerator pedal is disclosed in U.S. Pat. No. 6,078,860. The '860 patent teaches a method for controlling the speed of a vehicle based on a position of the accelerator pedal. The '860 patent teaches that logic is provided, which is operative to keep the speed of the vehicle constant when the position of the accelerator held at a position different from a predetermined natural position. In this method, the speed of the vehicle is sensed and the position of the accelerator pedal is sensed. Additionally, the speed of the vehicle is detected to determine whether it is less than a predetermined low speed threshold. Further, the speed of the vehicle is controlled when the position of the pedal is held below the predetermined natural position and the speed of the vehicle is less than the predetermined low speed threshold.

The '860 patent has a pedal function that works differently than conventional pedal systems. This unusual arrangement might strike the driver as unnatural compared to conventional systems. The '860 patent operates to deflect from constant speed pedal position until desired speed is attained and then return to constant speed pedal position.

SUMMARY OF THE INVENTION

It is an object of the present invention to provide a method and system for providing vehicle control to a driver through the use of various inputs.

It is a further object of the present invention to provide a method and system for providing vehicle control based on a combination of speed and torque control.

It is yet another object of the present invention to provide a method and system for providing vehicle control based on accelerator position.

In accordance with the above and other objects of the present invention, a method and system for interpreting driver command based on an accelerator position and an electronic throttle angle is provided.

Additional objects and features of the present invention will become apparent upon review of the drawings and accompanying detailed description of the preferred embodiments.

DETAILED DESCRIPTION OF THE PREFERRED EMBODIMENTS

Figure 1:
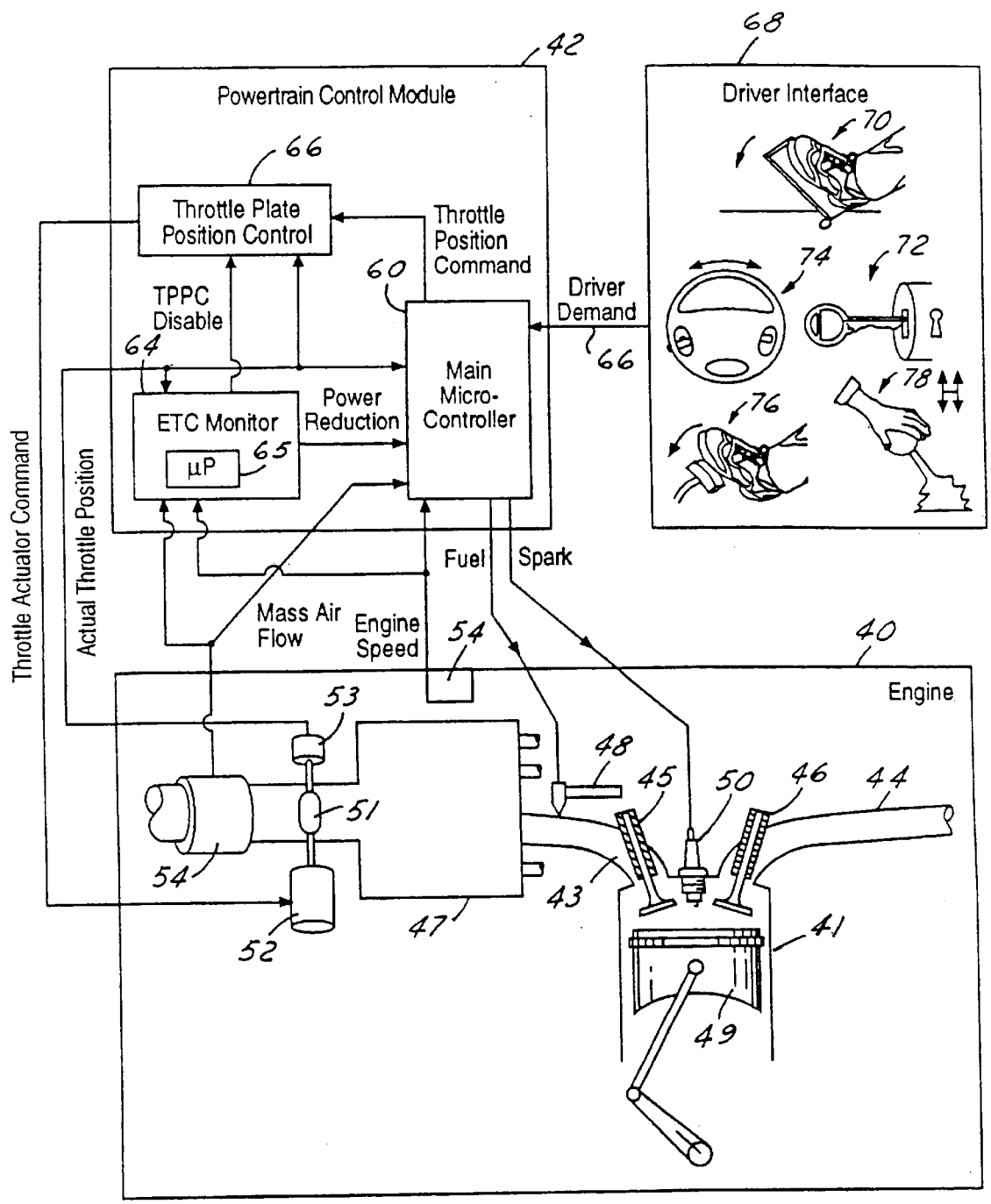
FIG. 1 is a schematic diagram generally illustrating a preferred arrangement of a system for mapping pedal position to electronic throttle position so as to provide vehicle control to a driver according to the present invention.

Referring now to FIG. 1, there is shown a schematic diagram of an internal combustion engine and associated powertrain control module, as well as an operator interface, in accordance with one embodiment of the present invention.

The engine includes a plurality of combustion chambers each having an associated intake and exhaust operated by respective valves. Combustion occurs as a result of the intake of air and fuel from the intake manifold and fuel injector respectively, compression by the piston and ignition by the spark plug. Combustion gases travel through the exhaust manifold to the downstream catalytic converter and are emitted out of the tailpipe. A portion of the exhaust gases may also be recirculated back through the intake manifold to the engine cylinders.

The airflow through the intake manifold is controlled by a throttle comprising a throttle plate and throttle actuator. A throttle position sensor measures the actual throttle position. Mass airflow sensor measures the amount of air flowing into the engine. An engine speed sensor provides value indicative of the rotational speed of the engine.

The powertrain control module (PCM) receives as inputs the throttle position signal, the mass airflow signal, the engine speed signal, and the driver demand inputs. In response, the PCM controls the spark timing of the spark plugs, the pulse width of fuel injectors and the position of the throttle by way of the throttle actuator. All of these inputs and outputs are controlled by the main microcontroller. The main microcontroller controls the throttle position by outputting a throttle position command to the throttle plate position controller to drive the throttle actuator to the desired position.

The PCM includes an electronic throttle control (ETC) monitor, which communicates with the main microcontroller and throttle plate position controller. The ETC monitor includes a microprocessor and associated memory separate from the microprocessor in the main microcontroller. The ETC monitor receives as inputs the engine speed signal, from engine speed sensor and throttle position signal from the throttle position sensor. As will be described in further detail below, the ETC monitor monitors the throttle actuation for diagnostics and improved safety.

Although the ETC monitor is shown as separate from the PCM main microprocessor, it could be partially or wholly integrated into the main microprocessor as well. In addition, the ETC monitor could also be integrated into the throttle plate position controller.

The PCM also receives as an input driver demand signals. The driver demand signals can include such things as accelerator pedal position, ignition switch position, steering input, brake sensor, transmission position input, as well as inputs from the vehicle speed control.

In operation, the ETC monitor monitors the throttle position and throttle command separate from the main microcontroller, which executes the primary throttle position control. The function of the ETC monitor is to detect invalid throttle positions. The ETC monitor does an independent check on whether the power/torque/speed of the vehicle corresponds to driver request as determined from the above mentioned driver inputs (68). The disclosed invention provides both torque and speed control modes in a more natural and subtle manner than the system disclosed in the above mentioned '860 patent. The disclosed system achieves a new speed control point by altering pedal position easily because of the intentional friction designed into the pedal.

The driver controls the speed and acceleration of the vehicle by deflecting an accelerator pedal to a specific pedal position. The pedal sensor is adjacently coupled to the accelerator pedal in order to detect the pedal position. The pedal sensor sends a signal indicating the pedal position to the powertrain controller. Using the pedal position and the other input signals received from the remaining sensors and the powertrain controller maps the pedal position to a specific electronic throttle angle based on the predetermined acceleration function and the predetermined speed function. This mapping provides the driver with direct control over vehicle speed, torque output, acceleration, or some combination of those.

Figure 2A:
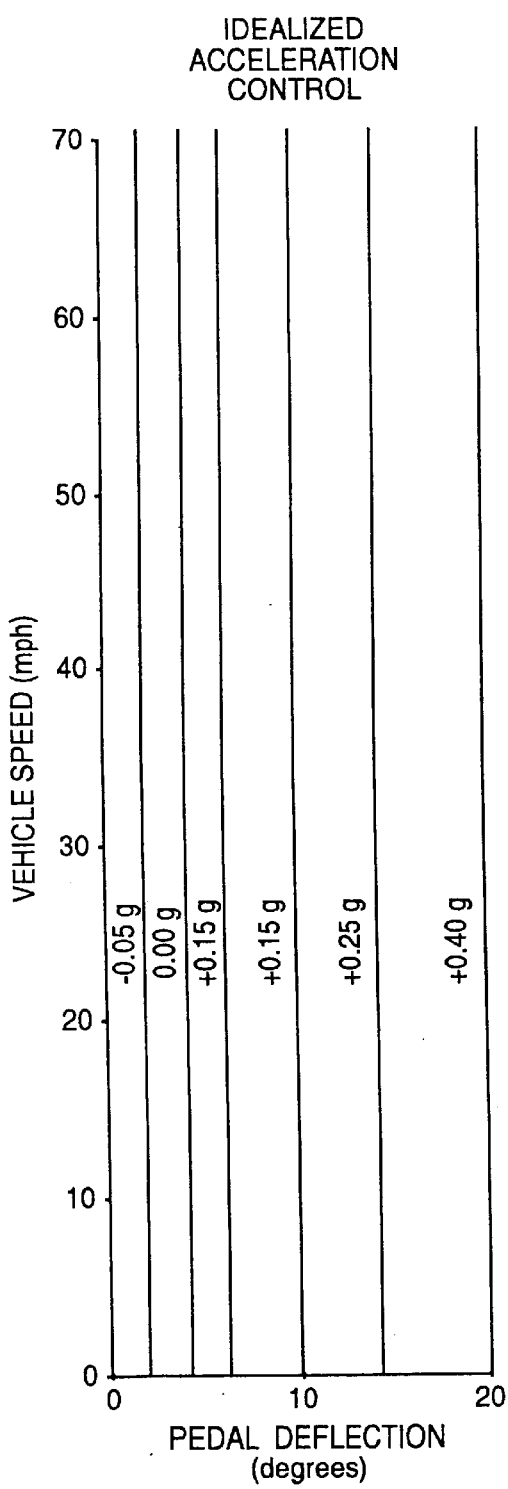
FIG. 2 is a graph schematically illustrating idealized acceleration control.
FIG. 2b is a graph schematically illustrating idealized speed control.
Figure 2B:
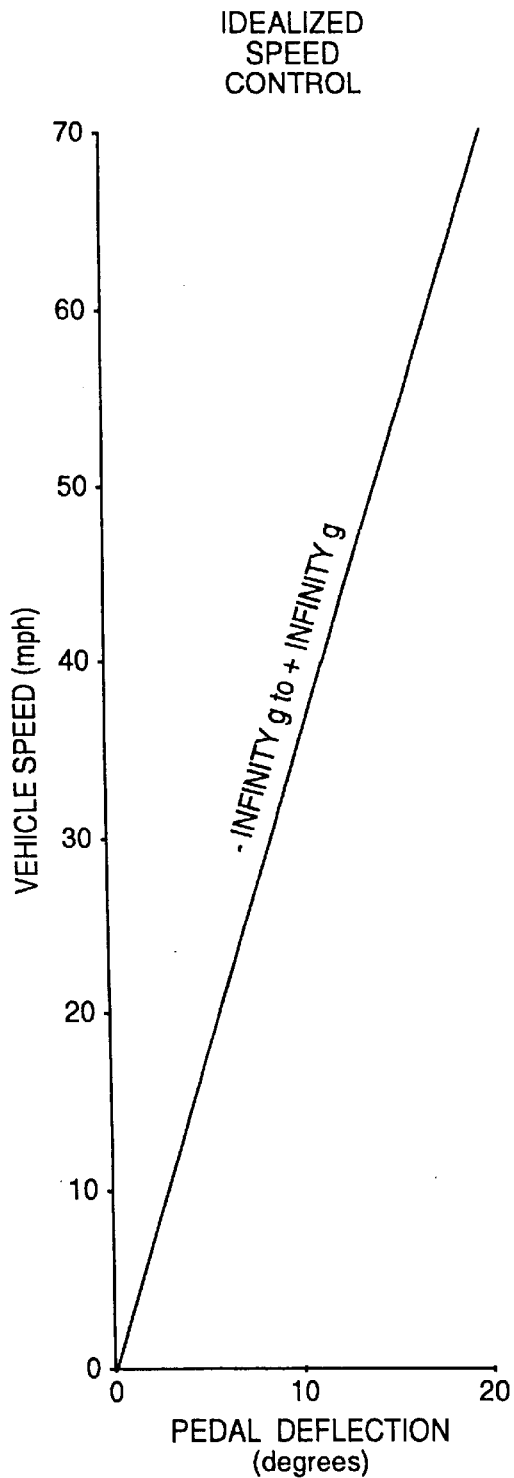

Referring to FIGS. 2a and 2b, which graphically illustrate idealized acceleration control and idealized speed control for a vehicle. FIG. 2a plots vehicle speed in miles per hour against accelerator pedal deflection in degrees. As the force on the pedal or pedal deflection increases (acceleration) or decreases (deceleration), the vehicle acceleration is increased as represented by the plurality of straight lines throughout the entire range of vehicle speeds. In other words, depending upon pedal position (or pedal force) a vehicle acceleration/deceleration is commanded by the driver. FIG. 2a demonstrates that there is no dependence of vehicle speed on vehicle acceleration, (i.e. acceleration is independent of vehicle speed).

FIG. 2b plots vehicle speed in miles per hour against accelerator pedal deflection in degrees. As shown, a single line is generated such that a particular accelerator pedal position is associated with a given vehicle speed. Stated in another way, the driver selects his target vehicle speed based on pedal position or pedal force. Under this idealized concept, a single line exists for all possible accelerations. This ideal behavior is disadvantageous because it provides for only a single pre-selected acceleration or a maximum vehicle acceleration between speeds. It should be understood that while the graphs of FIGS. 2a and 2b reflect ideal concepts, true speed control or acceleration control are never ideal.

Figure 3:
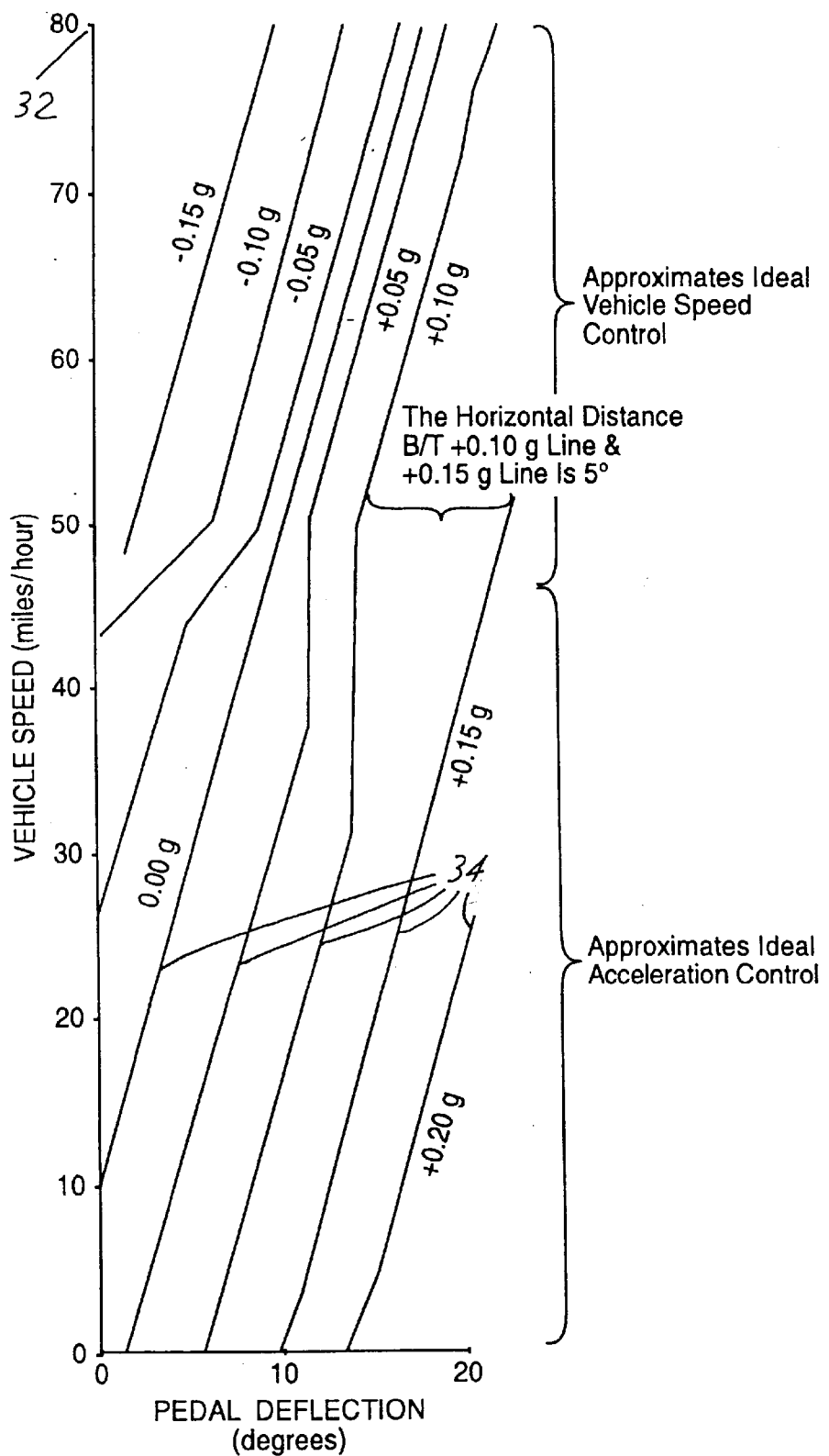
FIG. 3 is a graph illustrating the transition between torque control and vehicle speed control according to the present invention.

Turning now to FIG. 3, a graph illustrates a mapping between pedal position and vehicle speed so as to provide direct control over vehicle speed and torque output according to the present invention. Unlike the graphs in FIGS. 2a and 2b, the mapping of the present invention, which is plotted in FIG. 3, is a combination of both torque control and speed control based on accelerator pedal positions and vehicle speed. Lines of constant acceleration are plotted on a graph of vehicle speed versus pedal deflection. In FIG. 3, vehicle speed is plotted versus pedal deflection and as the deflection on the pedal increases or decreases, the vehicle proportionally accelerates or decelerates. In operating a vehicle within speeds ranging from zero miles per hour to forty-five miles per hour, a typical driver is more interested in controlling acceleration than he is interested in controlling to a set speed. Consequently, the powertrain controller identifies this range of vehicle speeds as an acceleration region wherein the powertrain controller maps pedal position to electronic throttle angle according to a plurality of predetermined acceleration functions. The acceleration region is intended to replicate or approximate ideal acceleration control, as shown in FIG. 2a above. These predetermined acceleration functions directly correlate pedal position to torque output so as to provide the driver with direct control over torque output acceleration control or tractive effort control of the vehicle.

In operating a vehicle at speeds greater than forty-five miles per hour, a typical driver is more interested in maintaining a constant speed than he is interested in setting a level of acceleration. Consequently, the powertrain controller identifies this range of vehicle speeds as a steady speed region wherein the powertrain controller maps pedal position to electronic throttle angle according to a plurality of predetermined speed functions. These predetermined speed functions directly correlate pedal position to vehicle speed so as to provide the driver with direct control over the vehicle speed.

In FIG. 3, above 50 miles per hour the lines of constant acceleration are parallel. This corresponds to a proportional term of approximately 0.01 g per miles per hour of speed error. In accordance with the invention (FIG. 3), at speeds below 45 miles per hour, control is predominately torque/acceleration/tractive effort control. Since the lines of constant acceleration are not vertical, it has some characteristics of speed control.

In accordance with a further aspect of the invention, the powertrain controller maps pedal position to torque control if the driver deflects the pedal beyond a maximum pedal deviation from a zero acceleration line of steady speed. Therefore, a driver operating a vehicle at speeds greater than forty-five miles per hour receives direct control over acceleration of the vehicle if the driver deflects the pedal beyond the maximum pedal deviation. In a preferred embodiment, the maximum pedal deviation is five degrees greater than or less than the zero acceleration function.

Figure 4:
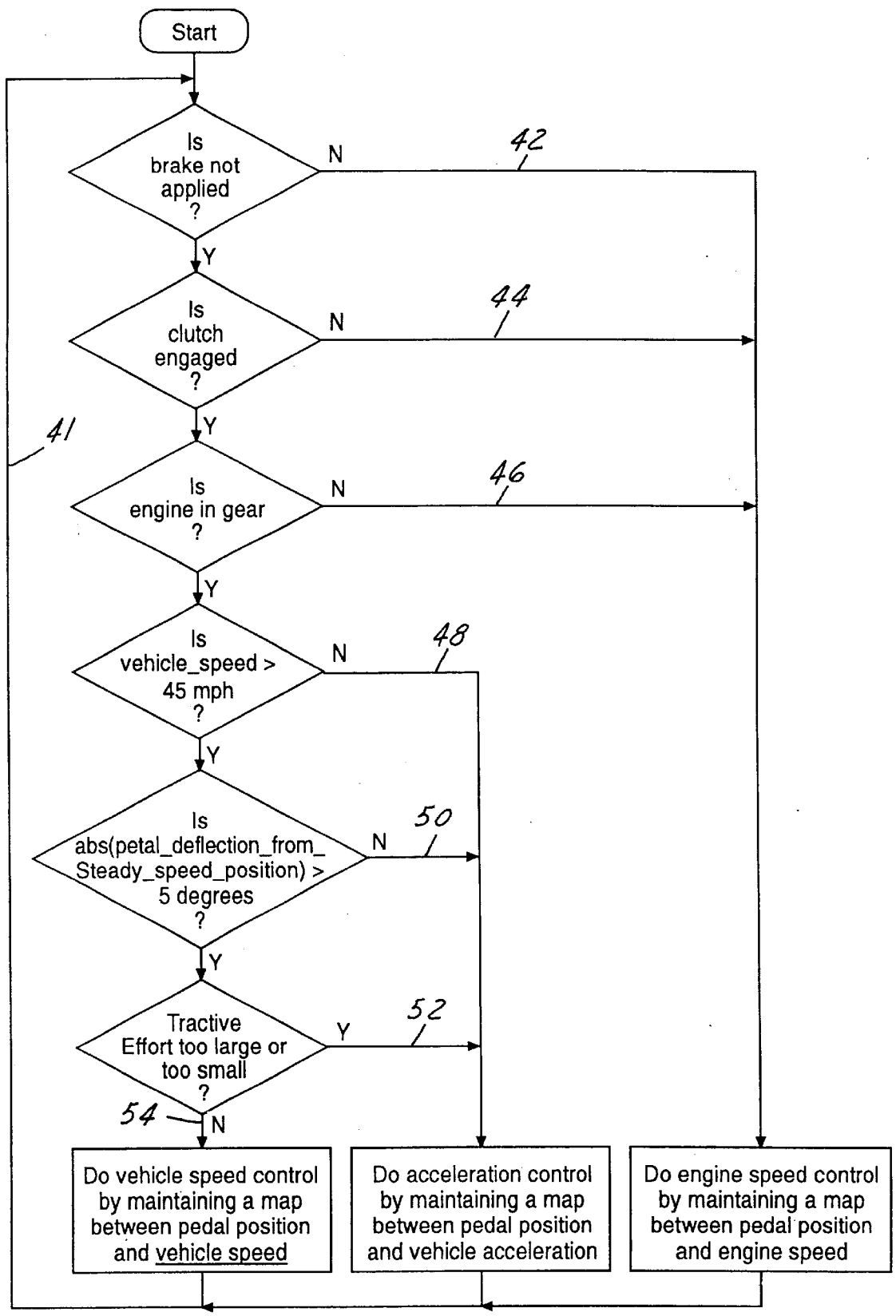
FIG. 4 is a flow diagram illustrating the general sequence of steps associated with the operation of the present invention.

Turning now to FIG. 4, a flow diagram illustrates the general sequence of steps in a closed loop for a preferred embodiment of the present invention. The powertrain controller selects a mapping for a pedal position based on the input it receives from at least one of the brake sensor, clutch sensor, transmission sensor, speed sensor, and pedal sensor. Once the powertrain selects a mapping for pedal position, a return step occurs wherein the system restarts at the to the first step of the flow diagram.

If the brake sensor indicates that the driver is applying the brake, a first step requires the powertrain controller to map pedal position to engine speed. The pedal position is mapped to engine speed so as to permit a minimum engine speed and a maximum engine speed. Under this mapping, a minimum pedal deflection requires the minimum engine speed so as to conserve fuel, minimize emissions, and prevent the engine from stalling. On the other hand, a maximum pedal deflection requires the maximum engine speed. Excess engine speed may damage the engine.

If the brake sensor does not indicate an application of the brake, a second step concerning clutch engagement occurs. The clutch sensor transmits a signal to the powertrain controller indicating whether or not the clutch is engaged. If the clutch sensor indicates that the clutch is disengaged, the second step requires the powertrain controller to map pedal position to engine speed in the same manner as pedal position is mapped to engine speed in the first step.

If the clutch sensor indicates that the clutch is engaged, a third step concerning transmission engagement occurs. The transmission sensor sends a signal to the powertrain controller indicating whether or not the transmission is engaged. If the transmission sensor indicates that the transmission is disengaged, the third step requires the powertrain controller to map pedal position to engine speed in the same manner as pedal position is mapped to engine speed in the first step.

If the transmission sensor indicates that the transmission is engaged, a fourth step concerning vehicle speed occurs. The speed sensor delivers a signal to the powertrain controller indicating the vehicle speed. If the vehicle speed is less than or equal to forty-five miles per hour, the fourth step requires the powertrain controller to map pedal position to torque control based on a predetermined acceleration function. This mapping permits the driver to have direct control over the torque output and consequently over the acceleration of the vehicle.

If the vehicle speed is greater than forty-five miles per hour, a fifth step concerning pedal position occurs. The pedal sensor sends a signal to the powertrain controller indicating pedal position. If the pedal position is beyond the maximum pedal deviation from the zero acceleration line, the fifth step requires the powertrain controller to map pedal position to torque control based on the plurality of predetermined acceleration functions. The purpose of this step is to prevent situations from occurring where there is a gross mismatch between pedal deflection and powertrain output.

If the pedal position is not beyond the maximum pedal deviation from the zero acceleration line, a sixth step concerning tractive effort occurs. If the tractive effort of the vehicle exceeds a maximum tractive effort, the sixth step requires the powertrain controller to map pedal position to torque control according to the plurality of predetermined acceleration functions. The purpose of this step is to prevent potential wheel slippage while in speed control mode. In a preferred embodiment, the maximum tractive effort is equivalent to a tractive effort experience by the vehicle traveling up a five degree slope. The objective of this feature is to make sure the driver is aware of the unusually large demand for tractive effort. In a pure speed control, the driver would not know that he was maybe asking for huge amounts. This could cause the driver to make poor judgments on low friction road surfaces. This feature makes sure the only way the driver can ask for gobs of torque/tractive effort is if he has the go pedal significantly deflected.

If the tractive effort does not exceed the maximum tractive effort, a seventh step occurs wherein the powertrain controller maps pedal position to vehicle speed control.

While the invention has been described in connection with one or more embodiments, it should be understood that the invention is not limited to those embodiments. On the contrary, the invention covers all alternatives, modifications, and equivalents, as may be included within the spirit and scope of the appended claims.

What is claimed is:

1. A method for interpreting driver command based on accelerator pedal position and an electronic controlled throttle angle comprising:

sensing the position of the accelerator pedal;

mapping the pedal position and the electronic controlled throttle angle to a speed of an engine;

sensing a speed of a vehicle;

mapping the pedal position and the electronic controlled throttle angle to a plurality of predetermined speed functions if said vehicle speed is greater than a vehicle speed index, the pedal position determining and being directly related to said vehicle speed; and mapping the pedal position and the electronic controlled throttle angle to a plurality of predetermined acceleration functions if said vehicle speed is less than said vehicle speed index, the pedal position determining and being directly related to a vehicle acceleration of said vehicle.

2. The method of claim 1 further comprising the steps of:

sensing application of a brake;

sensing disengagement of a clutch;

sensing disengagement of a transmission; and mapping the pedal position and the electronic controlled throttle angle to a speed of an engine if there exists said brake application, said clutch disengagement, or said transmission disengagement.

3. The method of claim 2 wherein the step of mapping the pedal position and the electronic controlled throttle angle to said speed of said engine requires said speed of said engine to be limited to a predetermined maximum allowable speed.

4. The method of claim 1 wherein the pedal position and the electronically controlled throttle angle are mapped to said plurality of predetermined acceleration functions if the pedal position is greater than a maximum pedal deviation for steady speed.

5. The method of claim 4 wherein said maximum pedal deviation for steady speed is five degrees.

6. The method of claim 1 wherein the pedal position and the electronically controlled throttle angle are mapped to a plurality of reduced predetermined acceleration functions if at least one wheel spins without a portion of said at least one wheel fixedly contracting a driving surface.

7. The method of claim 1 wherein a pedal position at a maximum pedal deflection permits at least one wheel to spin such that a portion of said at least one wheel slides across a driving surface.

8. The method of claim 1 wherein the pedal position and the electronically controlled throttle angle are mapped to a plurality of predetermined acceleration functions if said vehicle travels on a grade greater than a slope index.

9. The method of claim 8 wherein said slope index is at least five degrees.

10. The method of claim 1 wherein the pedal position and the electronically controlled throttle are mapped to said plurality of predetermined acceleration functions if a road-load tractive effort differs from a flat-road tractive effort by what can be attributed to at least a five degree slope.

11. A system for interpreting driver command based on an accelerator pedal position and an electronic throttle angle comprising:

a pedal sensor for detecting the accelerator pedal position;

a brake sensor for detecting application of a brake;

a clutch sensor for detecting disengagement of a clutch;

a transmission sensor for detecting disengagement of a transmission;

a speed sensor for detecting a speed of a vehicle; and a controller for mapping the pedal position and the electronic throttle angle to a plurality of predetermined speed functions if said speed of said vehicle is greater than a vehicle speed index, said controller mapping the pedal position and the electronic throttle angle to a plurality of predetermined acceleration functions if said vehicle speed is less than said vehicle speed index or if the pedal position is greater than a pedal position index.

12. The system of claim 11 wherein said controller maps the pedal position and the electronic throttle angle to a speed of an engine if said brake is applied, said clutch is disengaged, or said transmission is disengaged.

13. The system of claim 12 wherein said speed of said engine is limited to a predetermined maximum allowable speed.

14. The system of claim 11 wherein the pedal position and the throttle angle are mapped to a plurality of reduced predetermined acceleration functions if at least one wheel spins without a portion of said at least one wheel fixedly contacting a driving surface.

15. The system of claim 11 wherein a maximum pedal deflection permits at least one wheel to spin such that a portion of said at least one wheel slides across a driving surface.

16. The system of claim 11 wherein the pedal position determines and is directly related to said vehicle speed if the pedal position and the electronic throttle angle are mapped to said plurality of predetermined speed functions.

17. The system of claim 11 wherein the pedal position determines and is directly related to a vehicle acceleration of said vehicle if the pedal position and the electronic throttle angle are mapped to said plurality of predetermined acceleration functions.

18. The system of claim 11 wherein the pedal position and the electronic throttle angle are mapped to said plurality of predetermined acceleration functions if the pedal position is greater than a maximum pedal deviation for steady speed.

19. The system of claim 18 wherein said maximum pedal deviation for steady speed is five degrees.

20. The system of claim 11 wherein the pedal position and the electronic throttle angle are mapped to said plurality of predetermined acceleration functions if said vehicle travels on a grade greater than a slope index.

21. The system of claim 20 wherein said slope index is five degrees.

* * * * *